July 9, 1940.  L. NEUBERGER  2,207,264
TOASTING APPARATUS
Filed June 2, 1938  4 Sheets-Sheet 1

INVENTOR
Lester Neuberger
BY
Pennie, Davis, Marvin & Edmonds
HIS ATTORNEYS

July 9, 1940.    L. NEUBERGER    2,207,264
TOASTING APPARATUS
Filed June 2, 1938    4 Sheets-Sheet 2
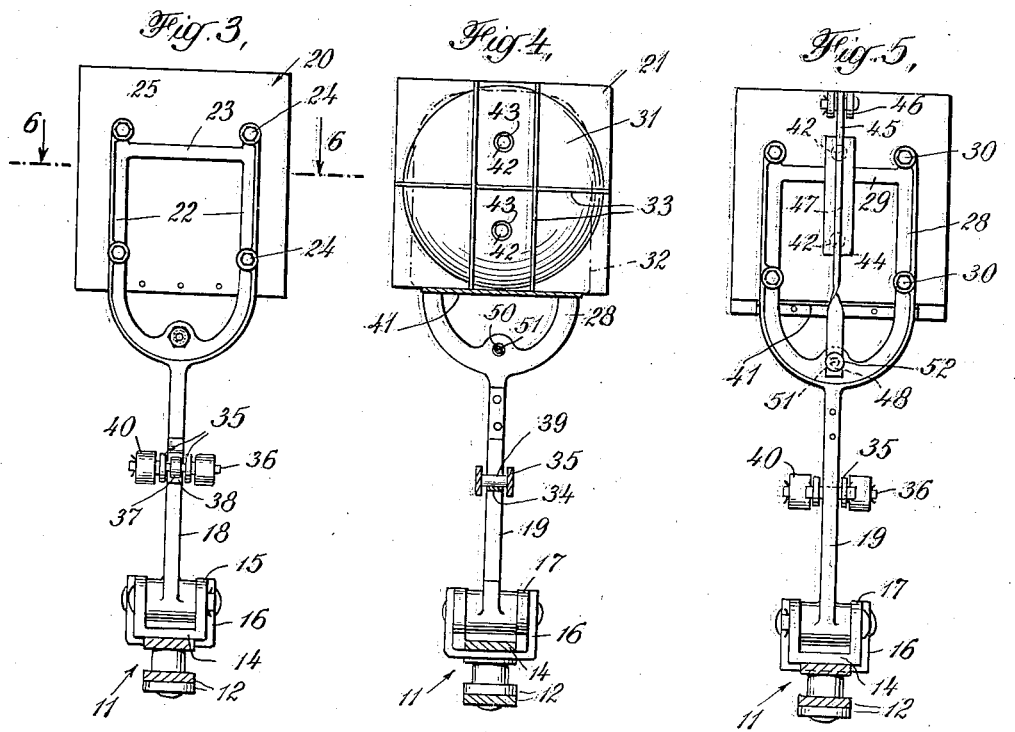
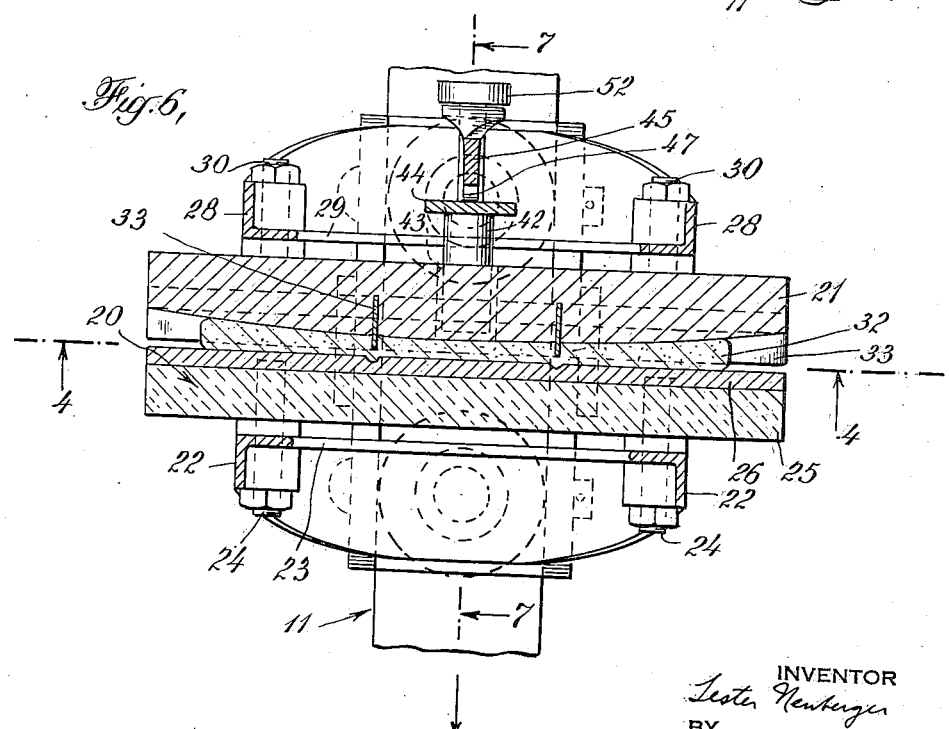
INVENTOR
Lester Neuberger
BY
Pennie, Davis, Marvin & Edmonds
HIS ATTORNEYS

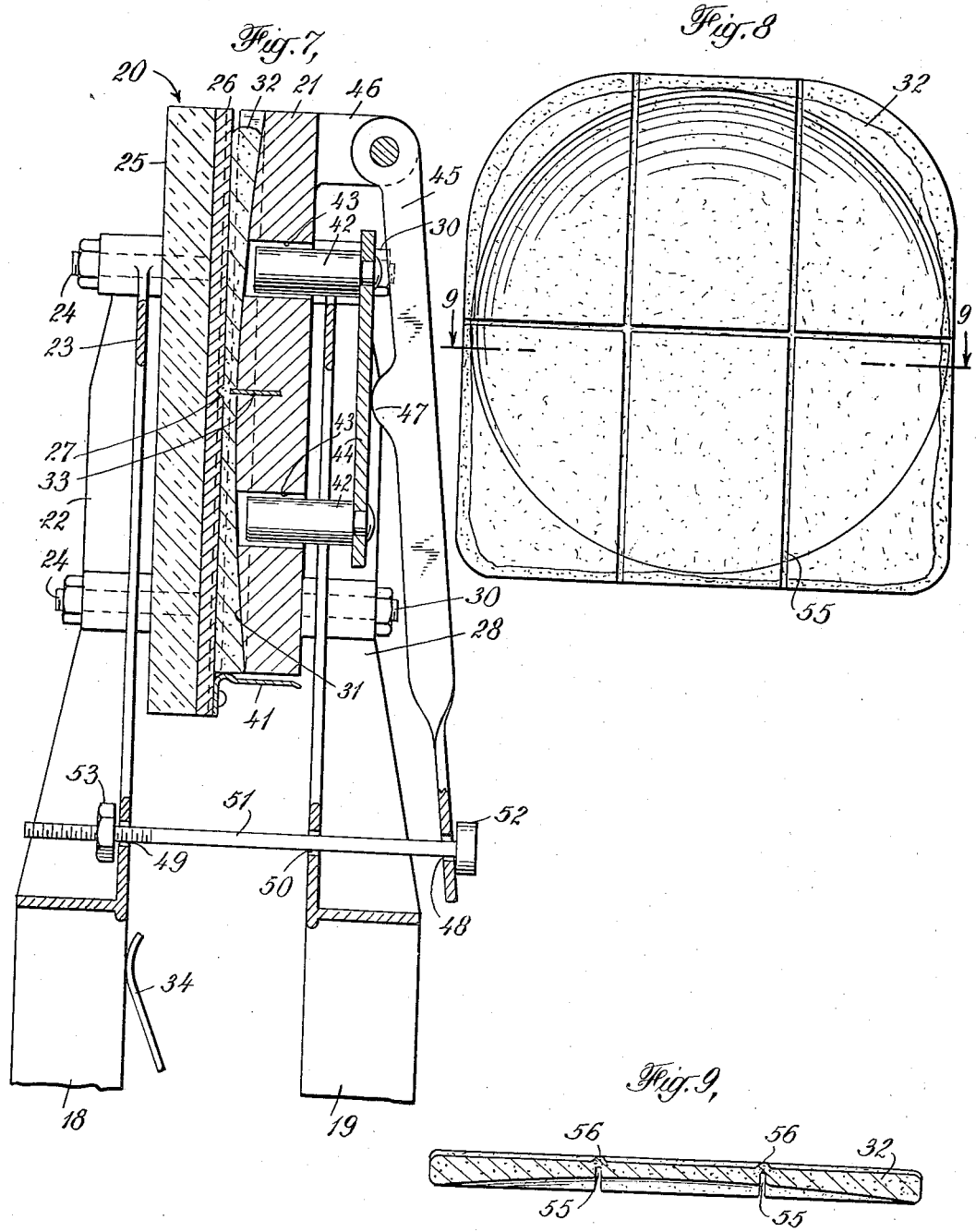

July 9, 1940.　　　L. NEUBERGER　　　2,207,264
TOASTING APPARATUS
Filed June 2, 1938　　　4 Sheets-Sheet 4
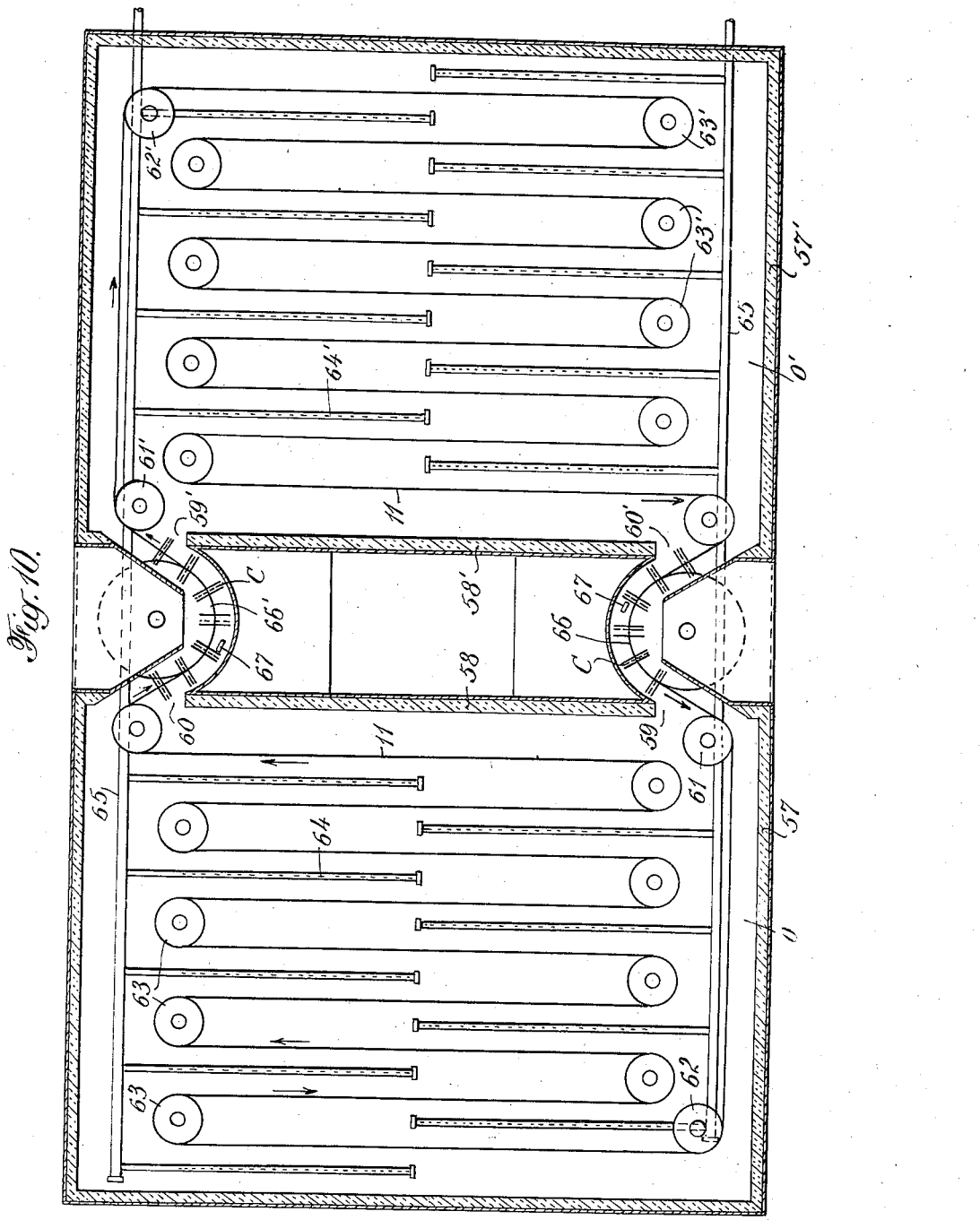
INVENTOR
Lester Neuberger
BY
Pennie, Davis, Marvin & Edmonds
HIS ATTORNEYS Patented July 9, 1940

2,207,264

UNITED STATES PATENT OFFICE 2,207,264

TOASTING APPARATUS

Lester Neuberger, New York, N. Y., assignor to Ward Baking Company, Bronx, N. Y., a corporation of New York Application June 2, 1938, Serial No. 211,376

6 Claims. (Cl. 53—5)

This invention relates to apparatus for producing toasted bread products, and has for its object the provision of an improved form of apparatus for toasting slices of baker's bread.

Practically all of the bread now sold by larger bakeries for domestic consumption is furnished in sliced condition, the demand for unsliced bread for this purpose being very small. Since the more reliable bakeries take back unsold bread before it has become stale, there is a substantial percentage of the total bakery output which must be disposed of other than as the usual retail product. This returned bread is of little or no value as such, and represents a substantial loss to the bakers.

In accordance with the invention of my copending application, Serial No. 151,317, filed June 30, 1937, an improved toasted product is produced by an improved method from returned sliced bread. It is the object of the present invention to provide improved apparatus for producing a toasted product of this type. Further objects of the invention include the provision of apparatus for the purpose explained which is simple in construction, and dependable and to a large extent automatic in its operation, whereby the desired toasted product may be produced at a very low cost. Other objects and advantages of the invention will be apparent from the following description.

In describing the invention in detail, reference will be made to the accompanying drawings in which an embodiment thereof has been illustrated. In the drawings:

Figure 3 is an end elevation of one of the carriers shown in Figure 1;

Figure 4 is a transverse section of a carrier, taken along the line 4—4 of Figure 6 and viewed in the direction of the arrows;

Figure 5 is an end elevation showing the opposite of the carrier from that shown in Figure 3;

Figure 6 is an enlarged sectional view, taken along the line 6—6 of Figure 3 and viewed in the direction of the arrows;

Figure 7 is a sectional view, taken along the line 7—7 of Figure 6;

Figure 8 is an elevation of a toasted bread slice;

Figure 9 is a sectional view of the toasted slice, taken along the line 9—9 of Figure 8; and Figure 10 is a diagrammatic plan view, partly in section, of the toasting ovens and the carrier conveying means comprising an installation of the improved apparatus.

Figures 1, 2:
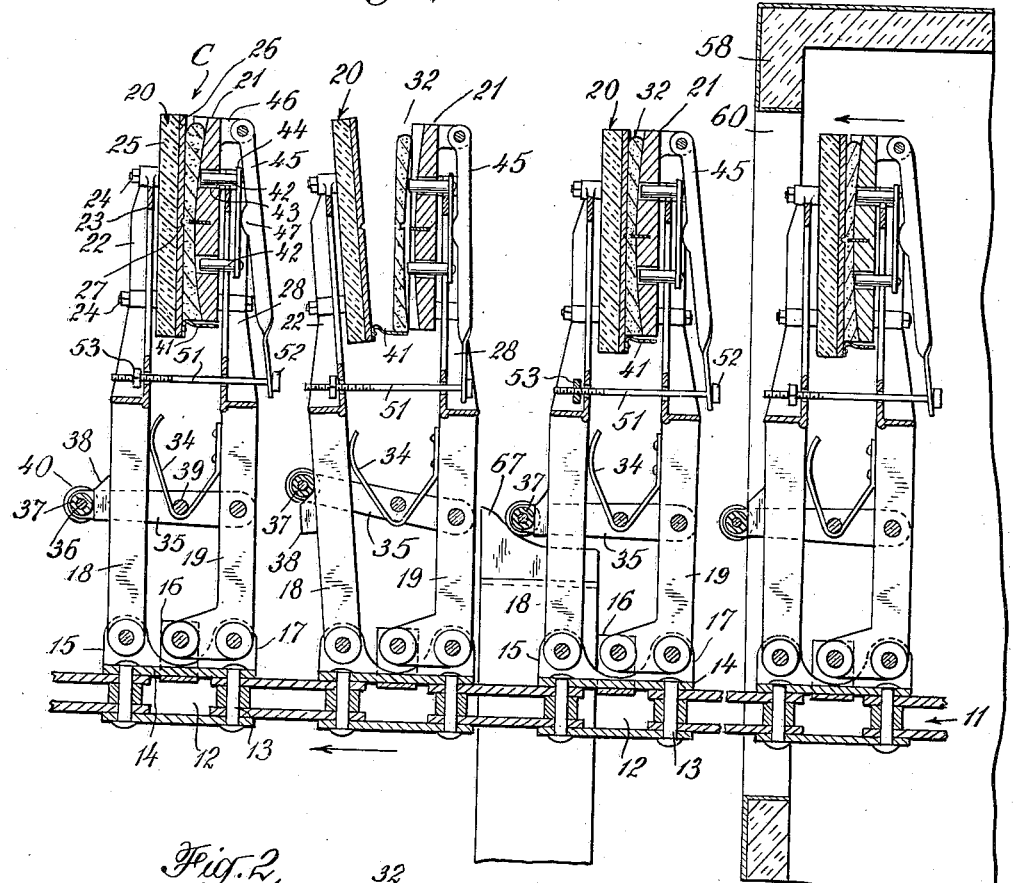
Figure 1 is a developed side elevation, taken on the line 1—1 of Figure 2, showing the carrier devices in which the sliced bread is held during toasting.
Figure 2 is a plan view of the apparatus shown in Figure 1.

The apparatus of the invention comprises generally a plurality of carriers, each adapted to hold a slice of bread to be toasted and secured at spaced points to a continuous conveyor element or chain supported on means, such as sprockets, and propelled at a suitable speed through one or more heated toasting ovens. The conveyor chain 11 may be of ordinary sprocket chain construction, and as shown in Figure 1, is provided with carrier supporting links 12 which may comprise alternate links of the chain as shown, or may be more widely spaced as desired. The chain is disposed with its pivots 13 vertical, and the upper plate 14 of each carrier supporting link 12 is provided with upstanding brackets 15, 16 and 17 secured thereto or formed integral therewith.

Each of the carriers C, a plurality of which are shown in Figures 1 and 2, comprises generally a pair of vertically extending arms 18 and 19 respectively carrying oppositely disposed cooperating toasting members or pads 20 and 21. The arms 18 and 19 are relatively movable, and in the disclosed embodiment, the lower end of the arm 18 is pivotally connected to the link plate bracket 15 and the lower end of the arm 19 is fixedly connected to the link plate 14 by pins passing respectively through the brackets 16 and 17.

As best shown in Figure 3, the upper end of the arm 18 is bifurcated to form two spaced brackets 22 connected by a cross brace 23. The toasting member or pad 20 is fixed to the brackets 22 by the bolts 24 or other suitable means. The pad 20 is preferably composed of a block or plate 25 of heat insulating material such as asbestos, porcelain or the like, carrying a metallic face plate 26 which forms the toasting surface. A plurality of intersecting grooves 27 are formed in and extend across the face of the plate 26 for cooperation with scoring blades on the opposite toasting member 21, as hereinafter described. The face plate 26 may be secured to the insulating block 25 by any suitable means, such as the bolts 24 as indicated in Figure 7.

As shown in Figures 4 and 5, the arm 19 has a bifurcated upper end forming the brackets 28 connected by the cross brace 29, and the toasting member or pad 21 is secured to the brackets 28 by volts 30. The pad 21 is formed of metal or other suitable material, and the face thereof which engages the bread slice or other material under treatment is of convex spherical form, as shown at 31, whereby the slice of bread 32 or other material is compressed to a greater extent at its central portions than along its edges when the pads 20 and 21 are brought together. This central compression of the toasted slice 32 is illustrated in Figure 9. The convex formation of one of the toasting pads has been found advantageous in producing an even toasting effect with a consequent uniformity of color over the entire surface of the bread slice 32.

The active face of the toasting pad 21 is provided with outwardly protruding scoring blades or knives 33, preferably arranged in intersecting lines across the face of the pad in the pattern shown in Figure 4. The pattern of the blades 33 corresponds to that of the grooves 27 on the face plate 26 of the opposite toasting pad 20. The grooves 27 are preferably wider than the thickness of the blades 33, whereby the bread 32 disposed between the pads 20 and 21 is not severed but instead is impressed with a scoring comprising a groove 55 on one side thereof and an upstanding ridge 56, aligned with such groove, on the opposite side, as shown in Figures 8 and 9. This scoring provides lines of weakness for conveniently severing the toasted slice along straight lines.

Suitable means are provided for moving the toasting members 20 and 21 to open or separate positions and for releasably latching or holding these members together in compressive engagement with a slice of bread 32 or like material. As shown in Figure 1, a reversely bent leaf spring 34 is fixed to the arm 19 and engages the adjacent surface of the opposite arm 18, thus urging the arms apart. The pad closing means illustrated comprises a pair of parallel links 35, pivotally secured to opposite sides of the arm 19, and connected by a cross pin 36 carrying a roller 37 and extending beyond the arm 18, as shown in Figures 1, 3 and 5. A block 38 is provided on the outer surface of the arm 18 for engagement by the roller 37 when the links 35 are depressed. The links 35 are connected between the arms 18 and 19 by a pin 39 which engages the spring 34 when the links 35 are lowered to move the toasting pads together. The pin 36 carries actuating rollers 40 at its opposite ends for operation by cam means during the movement of the carriers C as hereinafter described.

A bread supporting plate 41 of spring metal or other suitable material is fixed to the face plate 26 of the pad 20 adjacent its lower edge, and extends beneath the lower edge of the opposite pad 21 when the carrier C is closed. When the carrier is in the open position, the plate 41 supports the bread slice 32 and prevents it from falling between the arms 18 and 19, as shown in Figure 1.

The toasted bread slice 32 adheres more tenaciously to the member 21 carrying the scoring blades 33 than to the opposite member 20, and is thus usually carried by the member 21 when the carrier C is opened following the toasting operation. In order to facilitate removal of the toasted slice, means are provided for automatically dislodging it from the toasting member 21 upon opening movement of the carrier pads. In the disclosed embodiment, this is accomplished by providing a pair of dislodging pins 42, slidably supported in spaced holes 43 through the toasting pad 21, the outer ends of the pins 42 being fixed to a bar 44. A lever 45 is pivoted to a bracket 46 on the rearward surface of the pad 21 adjacent its upper end, and this lever carries a lug 47 which engages the bar 44 as shown in Figures 1 and 7. The lower end of the lever 45 is provided with an opening 48 substantially aligned with openings 49 and 50 in the arms 18 and 19 respectively. A bolt 51 or equivalent means passes through the aligned openings 48, 49 and 50, and has an enlarged head 52 engaging the outer face of the lever 45, and an adjustable nut 53 on the outer side of the arm 18. With this arrangement, when the arm 18 moves away from the arm 19 under the action of the spring 34, the bolt 51 is drawn to the left as viewed in Figure 7 and depresses the lower end of the lever 45, whereupon the pins 42 are driven through the holes 43 by the action of the lug 47 on the bar 44, and the toasted bread slice 32 is dislodged from the surface of the toasting pad 21.

The carrier devices C may be propelled by the chain 11 through any suitable toasting ovens. In a preferred embodiment of the invention, illustrated diagrammatically in Figure 10, the carriers C travel successively through a pair of spaced adjacent ovens O and O', and toasted bread slices are removed and replaced by untoasted bread slices as the carriers traverse the space between the two ovens. The ovens O and O', which may be of identical structure as shown, comprise insulated outer walls 57 and 57' adjacent walls 58 and 58'. Each of the adjacent walls 58 and 58' have openings 59, 60 and 59', 60' near their opposite ends. The chain 11, with the upstanding carriers C mounted thereon as described, enters each oven through the opening 59 or 59', passes to a point near the rear wall of the oven over the sprockets 61 and 61', 62 and 62' and returns in a circuitous path around the sprockets 63 and 63', finally emerging through the opening 60 or 60'. The sprockets which support or guide the chain 11 are disposed horizontally with their axes vertical, and the chain is driven at the desired low speed by the application of power through one or more of the sprockets.

Suitable heating means, such as the gas burners 64 and 64', are disposed in the ovens O and O' in staggered relation between the spans of the chain 11, and serve to heat both sides of the toasting carriers C as they pass along these spans. The burners 64 and 64' may be supplied with gas from a common pipe 65. In the space between the ovens O and O', the chain 11 is guided from each oven opening 60 or 60' to the opposite oven opening 59 or 59' by a large horizontal sprocket 66 or 66'. As shown in Figures 1 and 2, a suitably shaped upwardly extending cam 67 is fixed adjacent the periphery of each of the sprockets 66 and 66' in the path of the releasing rollers 40 which protrude laterally from the closing links 35 of the carriers C.

As each carrier C moves on the chain 11 out of an oven O or O', and passes the cam 67, its links 35 are lifted by engagement of one of the rollers 40 with the cam 67, and the central roller 37 between the links 35 is moved up out of engagement with the block 38 whereupon the arm 18 is pushed outwardly by the spring 34, thus opening the carrier. As the carrier moves to its fully open position, the pins 42 are operated as described above to dislodge the toasted slice 32 from the toasting pad 21, whereupon the slice is loosely carried between the separated pads by the plate 41 and may be removed and replaced manually or by suitable automatic means.

The carrier C is then closed on the untoasted slice by pressing down the links 35 so that the roller 37 engages the block 38, and the carrier continues its travel through the next adjacent oven. The chain 11 travels at such a slow speed that the above described removal and replacement of the toasted slice is readily accomplished while the carrier passes around the surface of the sprocket 66 or 66' between the ovens.

The toasting carriers C can be emptied and reloaded very rapidly and without substantial breakage of the toasted product. The toast dislodging mechanism may be adjusted by means of the nut 53 so that the finished slice 32 is gently removed without breakage, and the sprockets 66 and 66' act as steadying supports for the carriers C during the emptying and reloading operations. These sprockets also maintain the carriers in divergent positions during unloading and loading which facilitates the manipulation thereof.

Although the invention has been described in connection with a single illustrative embodiment thereof, it should be understood that various changes, omissions and substitutions of equivalents may be made within the scope of the invention as defined in the appended claims.

I claim:

1. Toasting apparatus comprising a horizontally disposed conveyor chain, a plurality of pairs of upstanding arms carried by said chain at spaced points thereon, means for pivotally securing at least one of said arms of each pair to said chain whereby said arms may be moved to closely adjacent and separated positions, oppositely disposed toasting pads secured respectively to the opposite arms of each of said pairs adjacent their upper ends, means for urging the arms of said pairs apart, releasable means for holding said arms together against action of said urging means and a stationary element adjacent said chain for operating said releasable means during the movement of said chain.

2. Toasting apparatus comprising a horizontally disposed movable conveyor chain, a plurality of pairs of upstanding arms disposed at relatively spaced points along said chain, means for fixedly connecting one of the arms of each of said pairs to said chain, means for pivotally connecting the other arm of each of said pairs to said chain, a pair of oppositely disposed toasting pads fixed respectively to the arms of each of said pairs adjacent their upper ends, means for resiliently forcing the arms of each of said pairs apart, releasable latch means for moving the arms of each of said pairs together and stationary cam means adjacent said chain for releasing said latch means during the movement of said chain.

3. Toasting apparatus comprising a continuous horizontally extending conveyor, a plurality of pairs of relatively movable toasting plates supported at spaced points along said conveyor, a plurality of spaced heated ovens, means for conducting said conveyor successively through said ovens and means disposed adjacent said conveyor in the space between said ovens for causing relative movement of the toasting plates of each of said pairs.

4. Toasting apparatus comprising a continuous horizontally extending conveyor, a plurality of pairs of relatively movable toasting plates supported at spaced points along said conveyor, releasable latch means connected to said plates for holding the plates of each of said pairs together, a plurality of spaced heated ovens, means for conducting said conveyor successively through said ovens and stationary means in the space between said ovens for releasing said latch means of each of said toasting plates as said plates are moved past said stationary means by said conveyor.

5. Toasting apparatus comprising a continuous horizontally extending conveyor, a plurality of toasting carriers secured to said conveyor at spaced points thereon, each of said carriers including a pair of relatively movable plates for compressively engaging a slice of bread therebetween and releasable latch means for holding said plates together, at least two spaced heating toasting ovens, means for conducting said conveyor successively through said ovens and across the space therebetween and stationary cam means in the space between said ovens for engaging and releasing the latch means of each of said carriers as said carriers are moved past said cam means by said conveyor.

6. Toasting apparatus comprising a continuous substantially horizontal conveyor chain, a plurality of toasting carriers secured to said chain at spaced points thereon and each comprising relatively movable toasting plates for compressively engaging and carrying a slice of bread to be toasted, at least two spaced heated toasting ovens, means for conveying said chain through each of said ovens, sprockets disposed in the spaces between said ovens engaging said chain and conveying the same in a fixed path, and stationary means adjacent said sprockets for causing relative movement of the toasting plates of said carriers.

LESTER NEUBERGER.